Feb. 28, 1967 A. DE FRANCISCO 3,307,030
PLUG-IN ELECTROLUMINESCENT DEVICE
Filed June 15, 1964
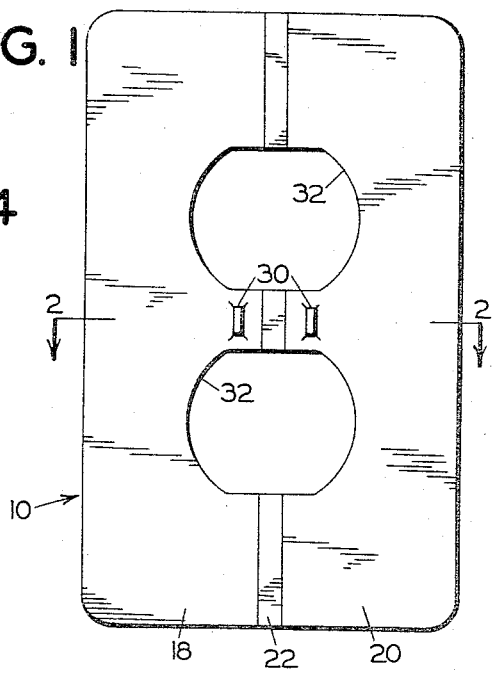
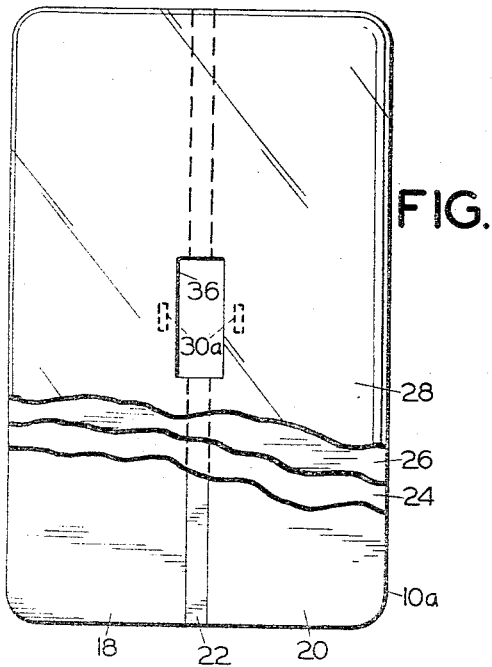
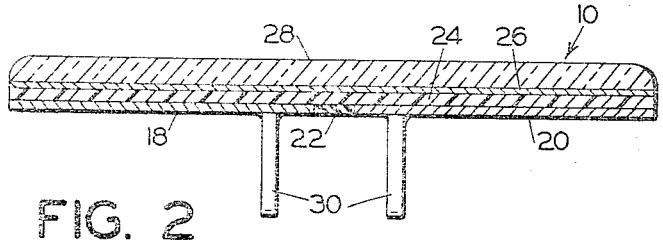
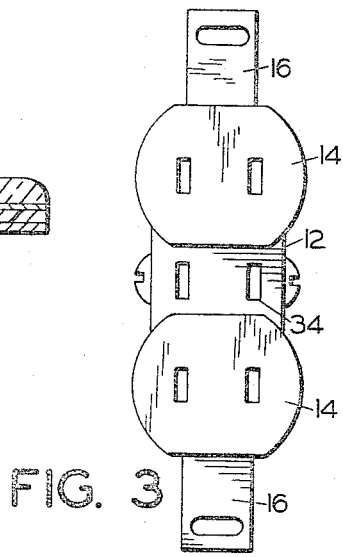
INVENTOR.
ARTHUR DE FRANCISCO
BY Eugene M. Eckelman
ATTORNEY United States Patent Office 3,307,030
Patented Feb. 28, 1967

3,307,030
PLUG-IN ELECTROLUMINESCENT DEVICE
Arthur De Francisco, 150 Chapman St.,
San Francisco, Calif. 94110
Filed June 15, 1964, Ser. No. 375,135
4 Claims. (Cl. 240—73)

This invention relates to an electroluminescent device and has for its primary objective to provide such a device in the form of an electrical cover plate capable of being plugged into an electric outlet wall socket.

More particularly, it is an object of the present invention to provide electrical cover plates, such as switch or outlet plates, of electroluminescent construction and having integral prongs thereon adapted to plug into electric outlet means.

Still another object is to provide a novel plug-in receptacle having the usual plug-in sockets and an extra plug-in socket for plugging in prongs from the above mentioned electrical cover plate.

Additional objects will become apparent from the following specification and claims, considered together with the accompanying drawings, wherein the numerals of reference indicate like parts.

In the drawings:

FIGURE 1 is a rear view of a cover plate for a plug-in receptacle embodying features of the present invention;

FIGURE 2 is an enlarged cross sectional view taken on the line 2—2 of FIGURE 1;

FIGURE 3 is a front view of a plug-in receptacle constructed to receive the socket cover plate of FIGURE 1; and FIGURE 4 is a front view of a switch cover plate embodying features of the present invention.

With particular reference to the drawings and first to FIGURES 1 and 2, the numeral 10 indicates generally a first form of electroluminescent device of the present invention. The device comprises a cover plate for a plug-in receptacle 12, FIGURE 3, having the usual plug-in portions 14 and tabs 16 for securing the receptacle to an electrical outlet box.

The cover plate 10 is of a conventional electroluminescent construction, comprising a bottom composite electrode layer formed of two metallic plates 18 and 20 disposed in parallel spaced relation. The space between the plates 18 and 20 receives an insulating strip 22. Positioned over the metallic plates 18 and 20 is a layer 24 of electroluminescent phosphor embedded in dielectric material. Positioned over the layer 24 is an additional electrode layer 26 which may comprise a tin oxide mounted on a glass or other transparent or translucent foundation 28. The structure of the electroluminescent device thus far described is conventional.

It is a feature of the present invention to provide each of the electrode plates 18 and 20 with a plug-in prong 30 extending rearwardly at right angles to such plates. When provided on a receptacle outlet cover plate of the type shown in FIGURE 1, the prongs are located longitudinally between the usual apertures 32, these apertures being of a size and shape to receive the plug-in portions 14 of the receptacle 12.

To accommodate the prongs 30 the plug-in receptacle 12 has a central, extra plug-in portion 34, and with the plate 10 mounted on the receptacle 12 the prongs 30 are engaged in plug-in portions 34 and the plug-in portions 14 project through the apertures 32.

FIGURE 4 shows a second form of the invention comprising a switch cover plate 10a. This plate has a central aperture 36 adapted to receive the handle of a switch and similar to the receptacle cover plate of FIGURE 1 the plate 10a includes electrode plates 18 and 20 separated by an insulating strip 22, a layer of electroluminescent phosphor 24 and an electrode layer 26 mounted on a glass foundation 28.

Similar to the FIGURE 1 embodiment the plate 10a also has a pair of rearwardly projecting prongs 30a which, similar to the prongs 30, are engageable with plug-in portions of a switch member. For this purpose said switch member will require a plug-in portion similar to the extra plug-in portion 34 shown in FIGURE 3.

Thus, in accordance with the present invention there are provided switch or socket cover plates having an electroluminescent construction and arranged for mounting on a wall fixture, such as switch or socket means merely by plugging them into plug-in structure of said switch or socket means. When plugged in the plates are illuminated and thus are visible in the dark.

It is to be understood that the forms of my invention herein shown and described are to be taken as preferred examples of the same and that various other changes in the shape, size and arrangement of parts may be resorted to without departing from the spirit of my invention or the scope of the subjoined claims.

Having now described my invention I claim:

1. An electroluminescent device in the form of a cover plate for an electric wall fixture comprising metallic electrode plates and a layer of electroluminescent material, and a pair of electrical plug-in prongs electrically connected to two of said electrode plates and extending at right angles to said electrode plates for plug-in engagement with a source of potential to illuminate the plate, said cover plate having an aperture extending therethrough parallel to said plug-in prongs and being arranged to receive a portion of the wall fixture when said prongs are plugged into the wall fixture.

2. In combination, an electroluminescent device in the form of an electric cover plate comprising metallic electrode plates and a layer of electroluminescent material, a pair of electrical plug-in prongs electrically connected to two of said electrode plates and extending at right angles to said electrode plates for plug-in engagement with a source of potential to illuminate the plate, and an electrical wall fixture having a pair of plug-in sockets opening forwardly thereof for receiving said prongs to connect the latter with a source of potential in said fixture to illuminate the plate, said wall fixture having a forward projection, said cover plate having an aperture extending therethrough parallel to said plug-in prongs and being arranged to receive said forward projection of the wall fixture when said prongs are plugged into the wall fixture.

3. The electroluminescent device of claim 2 wherein said wall fixture comprises a plug-in receptacle and has plug-in sockets in said projection for engagement by other electric apparatus when said cover plate is plugged into said wall fixture.

4. The electroluminescent device of claim 2 wherein said wall fixture comprises a switch.

References Cited by the Examiner
UNITED STATES PATENTS
3,056,897    10/1962    Knochel et al.
3,061,716    10/1962    Benander _____ 240—73

NORTON ANSHER, Primary Examiner.
C. R. RHODES, Assistant Examiner.